United States Patent
Fischer

(10) Patent No.: US 9,860,062 B2
(45) Date of Patent: Jan. 2, 2018

(54) COMMUNICATION ARRANGEMENT AND METHOD FOR GENERATING A CRYPTOGRAPHIC KEY

(71) Applicant: Infineon Technologies AG, Neubiberg (DE)

(72) Inventor: Wieland Fischer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 58 days.

(21) Appl. No.: 14/949,936

(22) Filed: Nov. 24, 2015

(65) Prior Publication Data

US 2016/0149702 A1 May 26, 2016

(30) Foreign Application Priority Data

Nov. 26, 2014 (DE) .................. 10 2014 117 311

(51) Int. Cl.
*H04L 29/06* (2006.01)
*H04L 9/08* (2006.01)
*H04W 12/04* (2009.01)

(52) U.S. Cl.
CPC .......... *H04L 9/0877* (2013.01); *H04L 9/0866* (2013.01); *H04L 9/0869* (2013.01); *H04L 9/0894* (2013.01); *H04W 12/04* (2013.01)

(58) Field of Classification Search
CPC ....... H04L 9/0894; H04L 9/3278; H04L 9/08; H04L 9/0816; H04L 9/0861; H04L 9/0866; H04L 9/0869
See application file for complete search history.

(56) References Cited

U.S. PATENT DOCUMENTS

| | | | |
|---|---|---|---|
| 2011/0286599 A1* | 11/2011 | Tuyls | G06F 21/602 380/278 |
| 2012/0072737 A1* | 3/2012 | Schrijen | H04L 9/3278 713/189 |
| 2013/0322619 A1 | 12/2013 | Yoshimi et al. | |

OTHER PUBLICATIONS

Leest et al.: "Soft Decision Error Correction for Compact Memory-Based PUFs using a Single Enrollment", CHES workshop 2012, 2012, 15 pages.

* cited by examiner

*Primary Examiner* — Edward Zee
(74) *Attorney, Agent, or Firm* — Viering, Jentschura & Partner mbB

(57) ABSTRACT

In various embodiments, a communication arrangement is provided. The communication arrangement includes a first communication device, and a second communication device. The first communication device includes a processing element configured to read out a device-specific number from a component of the first communication device, to mask the device-specific number by the random number and to transmit the masked device-specific number to the second communication device. The second communication device includes a mapping element configured to map the masked device-specific number to a codeword of a code and to transmit the codeword to the first communication device. The first communication device further includes a key generator configured to demask the codeword by the random number and to determine a cryptographic key based on the demasked codeword.

19 Claims, 9 Drawing Sheets

COMMUNICATION ARRANGEMENT AND METHOD FOR GENERATING A CRYPTOGRAPHIC KEY

CROSS-REFERENCE TO RELATED APPLICATION

This application claims priority to German Patent Application Serial No. 10 2014 117 311.2, which was filed Nov. 26, 2014, and is incorporated herein by reference in its entirety.

TECHNICAL FIELD

The present disclosure relates to communication arrangements and methods for generating a cryptographic key.

BACKGROUND

Small electronic devices equipped for wireless communication such as chip cards and RFID tags may in certain applications require a cryptographic key, for example for secure communication with a terminal or for authorization. Since the chip area and the computational resources of such electronic devices are limited approaches for supplying such an electronic device securely with a cryptographic key at low computational burden for the electronic device are desirable.

SUMMARY

In various embodiments, a communication arrangement is provided. The communication arrangement includes a first communication device, and a second communication device. The first communication device includes a processing element configured to read out a device-specific number from a component of the first communication device, to mask the device-specific number by the random number and to transmit the masked device-specific number to the second communication device. The second communication device includes a mapping element configured to map the masked device-specific number to a codeword of a code and to transmit the codeword to the first communication device. The first communication device further includes a key generator configured to demask the codeword by the random number and to determine a cryptographic key based on the demasked codeword.

Further, a method for generating a cryptographic key according to the above communication arrangement is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Physically Unclonable Functions (PUFs) may be applied for cryptographic applications and in cases where data or numbers are needed which should differ from device to device (e.g. from chip card to chip card or RFID tag to RFID tag) but should be reliably reproducible for a certain device. A number based on a PUF value of a device, i.e. based on a value generated by a PUF of a device, can for example be used as a unique identification (ID) of the device or may also be used as (or as a basis for) a secret key for a cryptographic application. In such an application the device typically operates together with a system as illustrated in FIG. 1.

Figure 1:
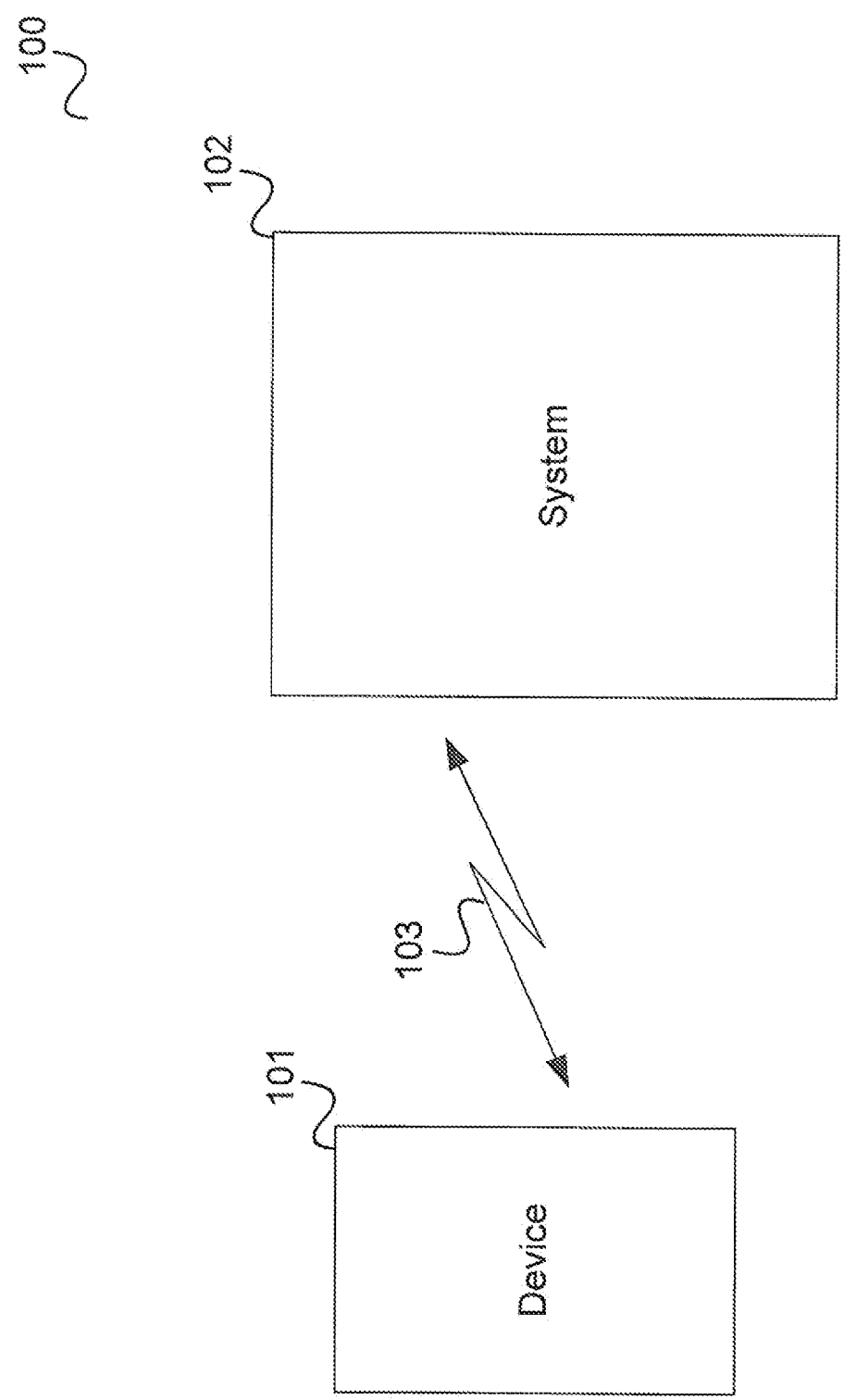
FIG. 1 shows a communication arrangement.

FIG. 1 shows a communication arrangement 100.

The communication arrangement includes a device 101 (e.g. a chip card or an RFID tag) and a system 102 (e.g. including one or more other devices).

The system 102 communicates with the device, for example wirelessly as indicated by arrow 103. For example, at the beginning of a communication, the device 101 is authorized with respect to the system 102. This may, in a simple case, consist of the transmission of a (unique) identification of the device 101. For a system with higher security requirements the authorization may further include a cryptographic protocol for proving the authenticity of the device. The system can for example be a single terminal or an arrangement of terminals and reading devices which may for example be connected (e.g. by an Internet connection). In the following, "system" can always be understood as one of these alternatives.

While in the case of the usage of a PUF value as identification of a device it is typically only important that the PUF value can be reliably reproduced and that it is unique (i.e. cannot be reproduced by a different device) it is important in case of the usage of a PUF value for generating a cryptographic key that the PUF value cannot be guessed by an unauthorized third party (wherein it depends on the overall scenario of the cryptographic application who is an unauthorized third party).

The following characteristics may be realized by means of PUFs:

(1) randomness,
(2) reliable reproducibility,
(3) secrecy.

From an electrical engineering point of view, a PUF can be seen as a circuit which reacts to a stimulus (e.g. power up or the supply of input data) with a response (e.g. one or more bits). An important characteristic is that an instance of such a circuit reacts to the same stimulus with high probability (i.e. nearly all the time) with the same response since this is the basis for characteristic (2) above. For characteristic (1) the response should depend only on the instance of the circuit. Ideally, an instance of the circuit is with a probability of 50% a circuit that reacts to a certain stimulus always with 1 and with a probability of 50% a circuit that reacts to the stimulus always with 0.

For characteristic (3) it is typically desirable that the response of the circuit does not have to be actively programmed into the circuit. For example, an NVM (non-volatile memory cell) programmed with a random bit could be used for fulfilling characteristics (1) and (2) but the bit would at least be known to the programmer. In contrast, a PUF, i.e. a circuit realizing (implementing) a PUF, typically stands out by that its response (e.g. bit response 0 or 1) depends on small process variations of its manufacturing process which cannot be actively controlled. An example for a PUF is an SRAM cell on a chip which is symmetrically designed (i.e. also the lithographic masks used for its manufacturing are symmetric). Still, in the manufacturing process, there may be small asymmetries which may for example depend on the specific illumination, the etching processes, doting processes etc. The instance of the SRAM cell (or generally the circuit) is thus slightly asymmetric, but typically in a non-visible manner. When the SRAM cell is powered up it will thus have a bias to one of its possible states 0 or 1 and assume one of these states with higher probability than the other. For example, an array of PUF cells, i.e. of cells responding with a bit, which is also referred to as PUF array in the following, e.g. an array of 128 SRAM cells, on a chip can be used for generating a cryptographic key, e.g. according to AES (Advanced Encryption Standard), in a manner which ideally fulfills the characteristics (1) to (3) since for two such chips which are equally designed (even two chips which have been manufactured adjacently on the same wafer or in the same location on two different wafers) there is a high probability that their PUF arrays respond to power up with different 128 bit values.

However, in practical application, an SRAM cell is typically rather symmetrically manufactured such that the bias to one of the initial states (0 or 1) is typically relatively weak such that such a cell takes both states with rather high probability upon power-up. The behavior of a PUF cell (e.g. an SRAM cell) can be described by a probability p which indicates the probability of the PUF cell responding with a 0. In a PUF array values of $p<0.01$ or $p>0.99$ are typically desired. However, this is typically difficult to realize in practical application.

Therefore, a PUF value generated by a PUF array may be supplemented by auxiliary data. These auxiliary data are generated when a device generates a secret (or an identification) by a PUF array. This process is for example carried out after manufacturing the chip or at the time of personalization of the chip and is in the following referred to as setup. At the setup, n bits $B=(b_1, \ldots, b_n)$ are generated by a PUF array including n (or more) cells $Z_1, \ldots, Z_n$. For example, bit $b_i$ is the response of cell $Z_i$. Alternatively, the cell $Z_i$ is stimulated a plurality of times and $b_i$ is the bit with which the cell $Z_i$ has responded more often. The n bits may also be generated from the PUF array in other ways. The process of generating the n bits by a PUF array is in the following referred to as reading process.

When the reading process is repeated at a later stage, some of the $b_i$ will, with non-negligible probability, have a different value than in the initial reading process at setup. To address this, auxiliary data $H=(h_1, \ldots, h_r)$ (the $h_i$ e.g. being bits) can be generated at setup such the following is fulfilled:

(a) a value $K=(k_1, \ldots, k_m)$ (the $k_i$ e.g. being bits) is derivable from the data B and H generated at setup. This value is for example used as identification or a secret value, as cryptographic key or basis for a cryptographic key.

(b) The mapping $(B, H) \rightarrow K$ of (a) is stable against a change of for example at most d bits of B (i.e. K does not change when d bits of B are changed). For this, d and accordingly r are adapted to the physical parameters of the chip's hardware and the reading process.

(c) H is, in principle, public data. Therefore, knowledge of H should provide no or little information about B and K.

Item (c) is for example important if K is a secret key. Item (c) allows storing the auxiliary data outside the device (and transmitting it to the device when needed). In context of (c) there may be further requirements such as that experimenting with H (by changing H, inputting the changed H into the device and monitoring the reaction of the device) must only allow deriving at most little information about B or K.

To fulfill the above requirements (in the first place (a) and (b)) codes may be used. An example for the usage of codes for generating a key based on a PUF value is explained in the following with reference to FIG. 2 and FIG. 3.

Figure 2:
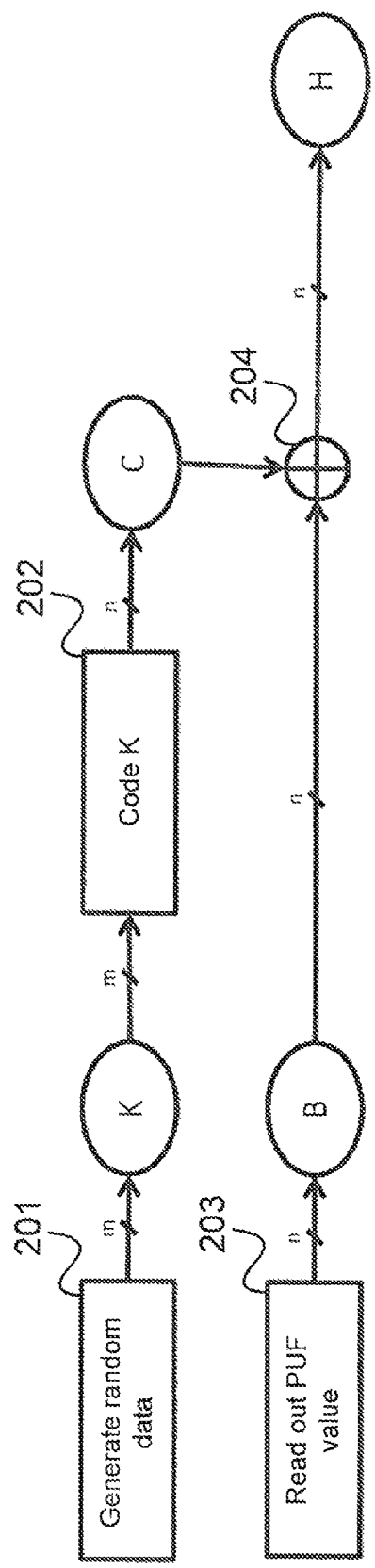
FIG. 2 shows the setup for a PUF-based generation of a key.

FIG. 2 illustrates the setup for a PUF-based generation of a key.

A value for the key $K \in M_K := F_2^m$ (i.e. $GF(2^m)$) is generated in 201, e.g. independent from the PUF, e.g. using a random number generator (RNG). In 202, this value is transformed into a codeword $C=c(K)$ using a coding mapping $c: M_K = F_2^m \rightarrow M_C \subset F_2^n =: M_D$ where $m<n$.

Here, $M_K$ denotes the set of all possible keys, $M_C$ is the set of codes in the space $M_D$.

In 203, the PUF array is read out and a PUF value $B \in M_B$ is determined where $M_B$ is the set of possible values for B. For example, $M_C \subset M_B = M_D$.

In 204, the auxiliary data are determined as the bitwise XOR of C and B, i.e.

$H := C \oplus B \in M_H = M_B$.

Figure 3:
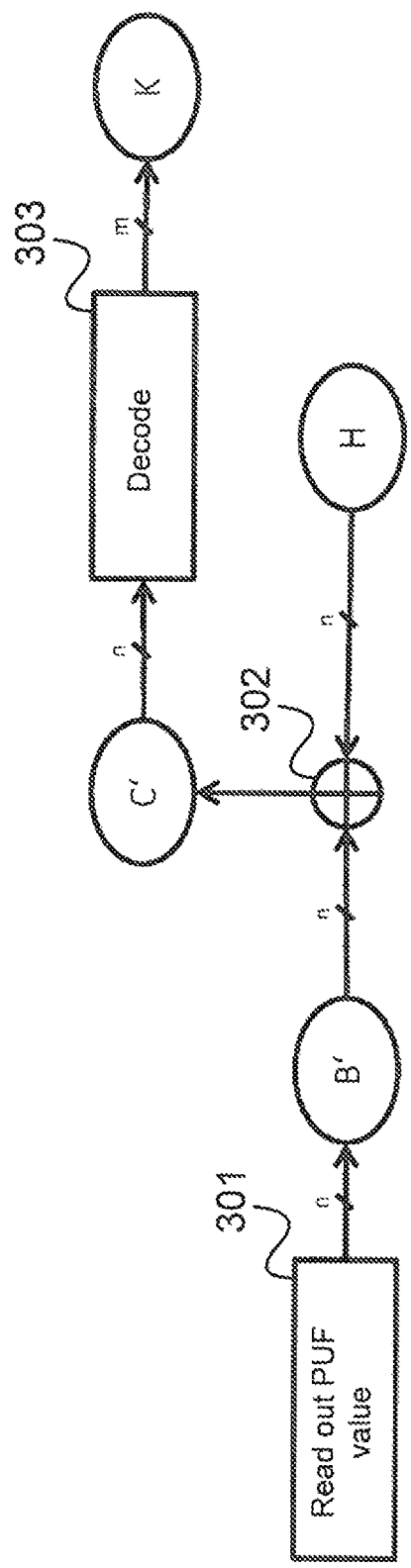
FIG. 3 shows the reconstruction a key based on a PUF value and auxiliary data.

FIG. 3 illustrates the reconstruction of a key based on a PUF value and auxiliary data.

In 301 the PUF array is read out to determine a value $B' \in M_B$. This value will typically be similar to B, i.e. will differ from B in only a low number of bits.

In 302, the value B' is XOR combined which gives a value $C'=H \oplus B'=C \oplus (B' \oplus B)$. The value C' only differs from C in the low number of bits in which B' differs from B. Since C is the codeword of a code, C can be reconstructed from C' under the assumption that the code can detect and correct the number of errors which (at most) occurs in the reading process (i.e. the number of differing bits between B and B'). Thus, in 303, the value K can reconstructed by means of the decoding mapping d:$M_D \rightarrow M_K$.

The reconstruction may be combined into a key determination mapping k: $M_B \times M_H \rightarrow M_K$.

The requirements (a) and (b) can be fulfilled if the code $M_C \subset M_B = M_D$ is sufficiently good to be able to correct the reading errors of B.

Whether (c) is fulfilled is not self-evident and typically requires a deeper cryptographic analysis. For (c) it is for example of importance that both random sources, i.e. the random number generator (for K) and the PUF array generate sufficient entropy. If the entropy of the RNG is too low, an attacker can guess K directly and independently from B and H. If the entropy of the PUF array is too low, the attacker can guess B and determine C and thus K from H.

A typical application scenario of a PUF-based generation of a secret key is described in the following with reference to FIGS. 4 and 5.

Figure 4:
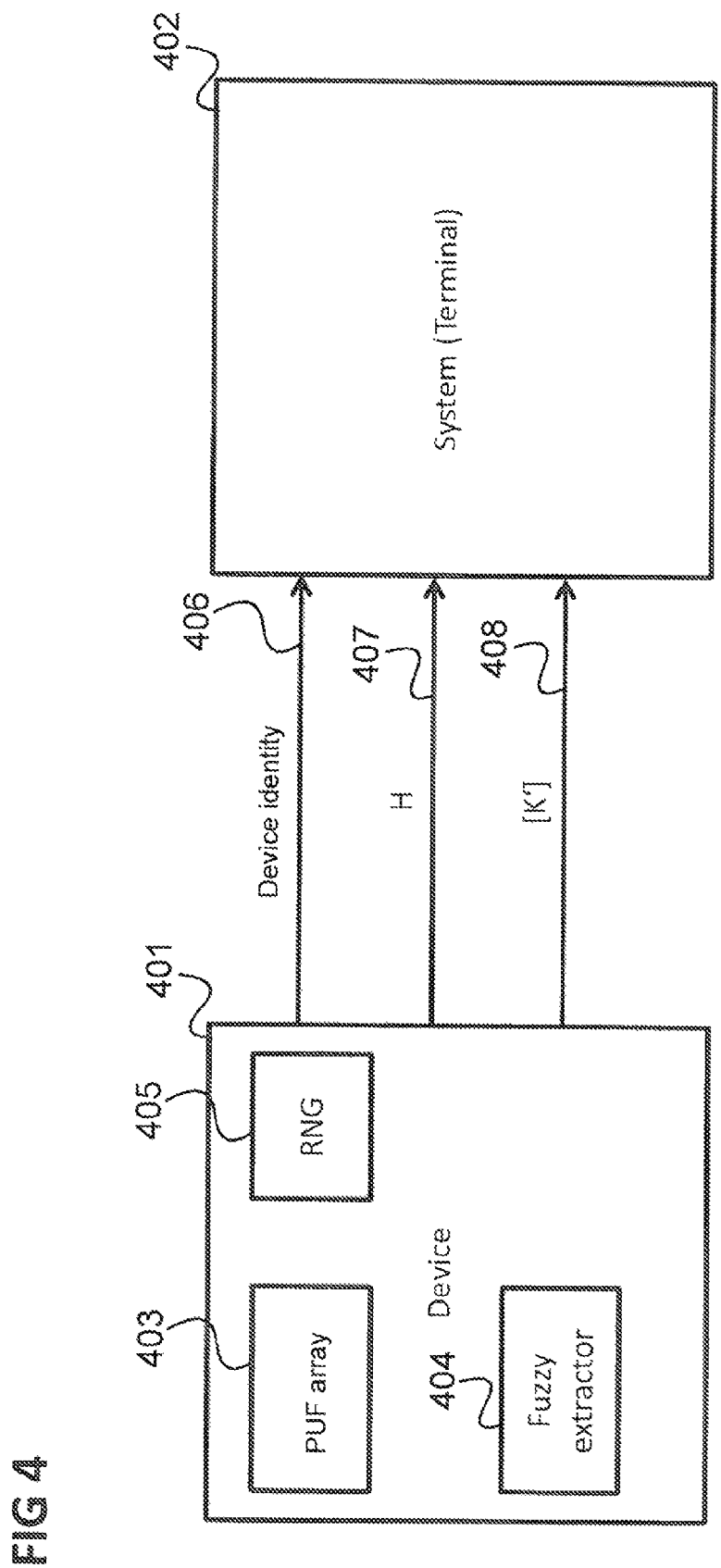
FIG. 4 shows the data flow for a setup for a PUF-based generation of a key.

FIG. 4 shows the data flow for a setup for a PUF-based generation of a key.

The data flow takes place between a device 401 and a system 402 as described with reference to FIG. 1.

The device 401 (e.g. a chip card) includes a PUF array 403 providing a PUF value. At a personalization time (setup) the device generates by a fuzzy extractor 404 a secret value (key) K and auxiliary data H based on a random number provided by a random number generator 405 and based on the PUF value (e.g. as described with reference to FIG. 2). The auxiliary data is exported in 407, e.g. together with an identification of the device in 406, in case the identification is not already known by the system 402, in some manner and may be published system-wide (or even beyond the system).

K is for example transmitted via a secure channel in 408 to the system 402 (e.g. a terminal). Alternatively, the device 401 may generate a public key K' from the secret key K, e.g. relating to a public key cryptosystem (PKC) such as RSA or an elliptic curve encryption/decryption scheme, which the device 401 transmits in 408 to the system 402 instead of the key K. In case of a public key K' the system may publish it. After the personalization the system 402 has access to the data H and K or K', respectively. Other alternatives are possible, for example, the device 401 may perform some encryptions with K for certain values and transmit the resulting encrypted values. Another alternative is that the device 401 uses K only internally, for example in a scenario where the device 401 has a non-volatile memory and carries out a memory encryption using K. In this case, it may for example be realized that the device can only read data from its memory when it is in contact with the system 402 by implementing the key reconstruction in such a way that the device 401 needs data from the system 402 as it is illustrated in FIG. 5.

Figure 5:
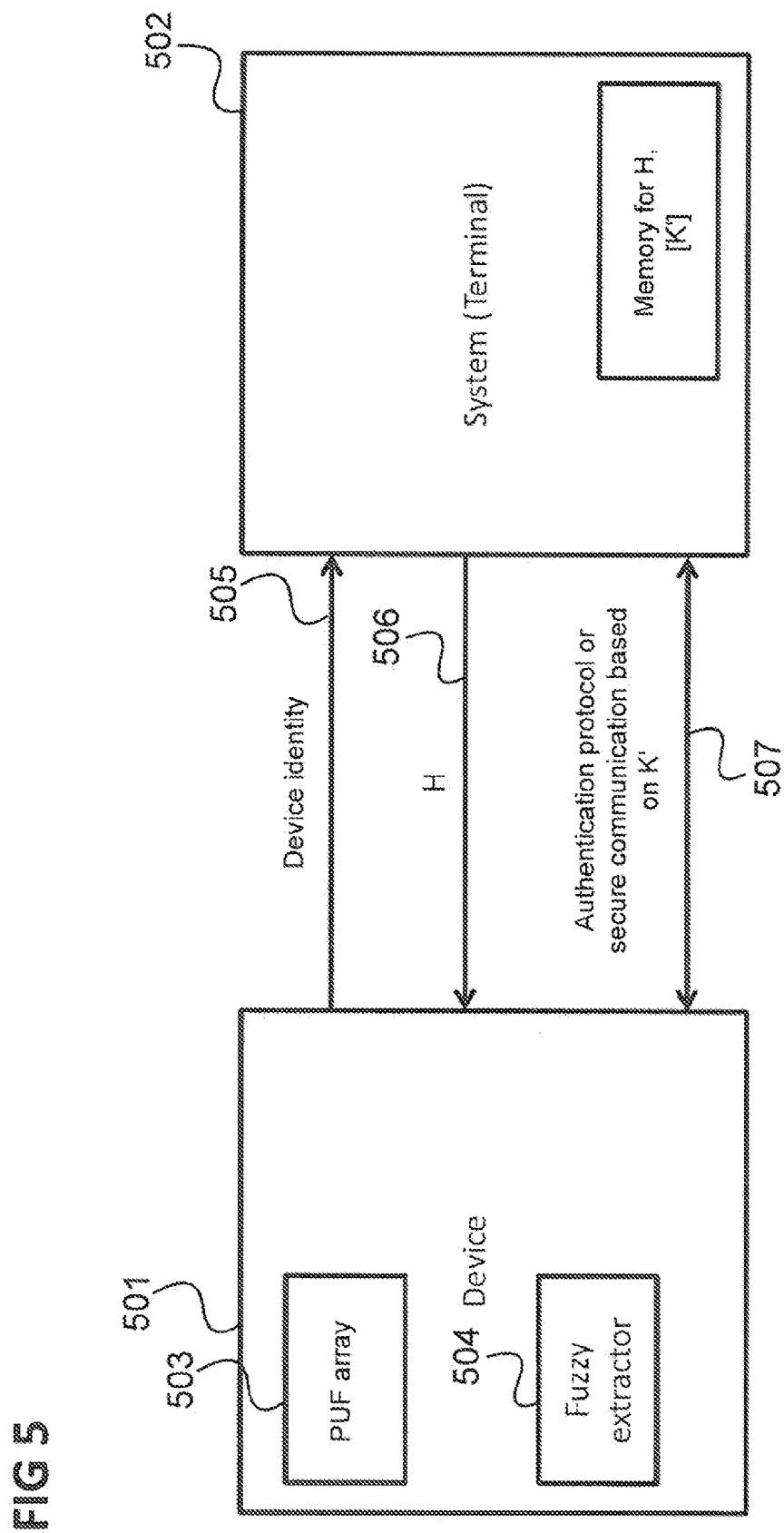
FIG. 5 shows the data flow for a reconstruction of a PUF-based generated key.

FIG. 5 shows the data flow for a reconstruction of a PUF-based generated key.

The data flow takes place between a device 501 and a system 502 corresponding to the device 401 and the system 402 of FIG. 4.

For reconstructing the key, the device 501 establishes contact (i.e. communication) with the system 502. The system 502 has access to the device-specific auxiliary data H (depending on for example the identification of the device which it for example transmits in 505 to the system 502). In 506, the system 502 transmits the auxiliary data H to the device 501. This allows the device to reconstruct the key K by means of the (possibly slightly altered) PUF value from the PUF array 503 and the fuzzy extractor 504 (e.g. as described with reference to FIG. 3). Depending on which value K or K' is known to the system 502, a symmetric or an asymmetric cryptographic algorithm/protocol may be used for transmitting data securely between the device 501 and the system 502 or an authentication protocol may be used for proving the device's identity to the system 502 in 507. Other protocols may be used based on the generated key.

The publication of the auxiliary data H can be set aside since only the corresponding device 401, 501 can make use of it. The device 401, 501 can also store the auxiliary data H internally, i.e. in a long-term memory such as an EEPROM or a flash memory. However, for this, the device 401, 501 needs its own non-volatile memory. This may not be desirable since typically, costs of the device (such as a chip card) should be kept low.

In summary, for the approach illustrated in FIGS. 4 and 5 the device 401, 501 which should be supplied with a secret PUF based key needs a PUF array, a fuzzy extractor, a random number generator and (possibly additional) communication components (which for example allow the transmission of the auxiliary data H, in addition to the components required for its normal operation (i.e. core functionality). Reducing the number of necessary components is typically desirable for reducing the costs of the device. However, a PUF array is needed in case the device should support PUF-based generation of a key. Further, a random number generator is typically required for a lot of protocols anyway. The fuzzy extractor (or a similar component) may however involve significant costs e.g. in terms of necessary chip area and implementation as well as the processing time in case of a software implementation.

Accordingly, in the following, embodiments are described which allow to moving the fuzzy extractor (or at least substantial parts of its functionality e.g. decoding) to the side of the system since typically, on the system side, sufficient computational resources are available which allow decoding also complex codes and the decoding is typically the most costly functionality of the fuzzy extractor.

Figure 6:
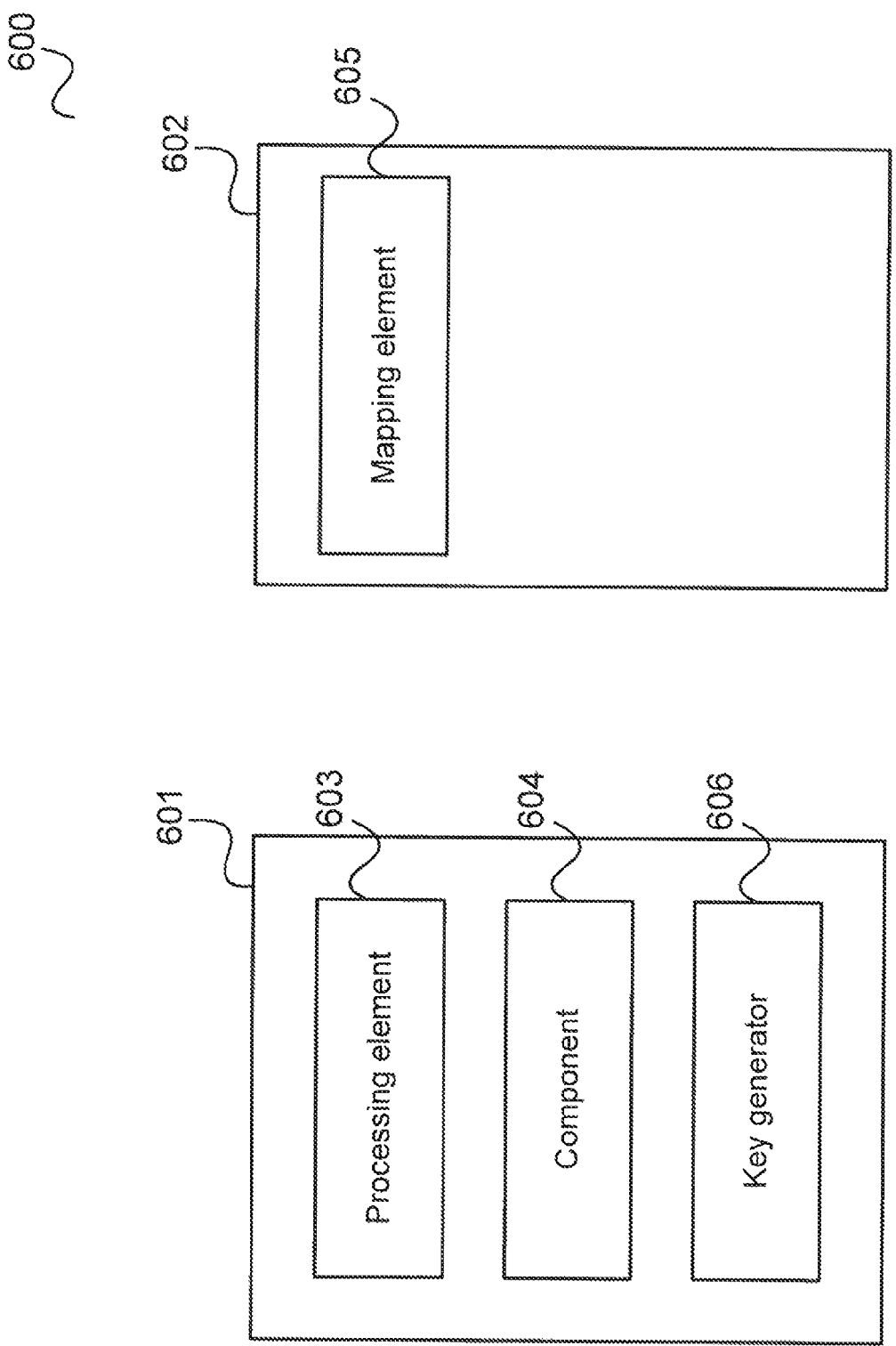
FIG. 6 shows a communication arrangement.

FIG. 6 shows a communication arrangement 600.

The communication arrangement 600 includes a first communication device 601 and a second communication device 602.

The first communication device 601 includes a processing element 603 configured to read out a device-specific number from a component 604 of the first communication device 601, to mask the device-specific number by means of the random number and to transmit the masked device-specific number to the second communication device 602.

The second communication device 602 includes a mapping element 605 configured to map the masked device-specific number to a codeword of a code and to transmit the codeword to the first communication device 601.

The first communication device 601 further includes a key generator 606 configured to demask the codeword by means of the random number and to determine a cryptographic key based on the demasked codeword.

According to one embodiment, in other words, a number such as a PUF value is read out from a component of a chip, is masked with a random number and transmitted to another device. The other device maps the masked number to a codeword (e.g. performs a decoding) and transmits the codeword back to the device based on which the device determines a key. Thus, the mapping of the masked number to a codeword (e.g. including a decoding) can be seen to be moved from the device to the other device such that a corresponding processing component or corresponding computational power does not have to be provided by the device. The demasking can be seen as the inverse operation of the masking, in other words removing the mask. For example, the result of the demasking is the codeword to which the (unmasked) number would have been mapped by the other device.

Regarding the example described with reference to FIG. 4 and FIG. 5, to move the decoding functionality on the system side, according to the approach of FIG. 6, the raw secret B (i.e. the PUF value) is masked before it is transmitted to the system side. This prevents an attacker from determining the PUF value by spying on the communication channel between the device 401, 501 and the system 402, 502. Additionally, depending on the application, e.g. in the PKC case, the key K thus stays unknown to the system 402, 502.

The device-specific number is for example a number specific for the first communication device.

For example, the device-specific number is a PUF value.

Accordingly, the component for example implements a PUF.

According to one embodiment, the mapping of the masked device-specific number to a codeword of a code by the mapping element includes combining the masked device-specific number with auxiliary data.

According to one embodiment, the mapping of the masked device-specific number to a codeword of a code by the mapping element includes centering the masked device-specific number by means of auxiliary data.

The auxiliary data is for example auxiliary data generated or stored in an initial mapping of the masked device-specific number to a codeword of the code.

According to one embodiment, the mapping element is configured to generate and store, in an initial mapping of the masked device-specific number to a codeword of the code, auxiliary data representing a difference between the masked device-specific number and the codeword (e.g. at the time of a setup).

For example, the initial mapping of the masked device-specific number to a codeword of the code is a mapping of an initial version of the masked device-specific number arising from an initial read-out of the device-specific number from the component to a codeword of the code.

According to one embodiment, the component may provide different versions of the device-specific number in different read-outs.

According to one embodiment, the mapping of the masked device-specific number to a codeword of a code by the mapping element includes decoding the masked device-specific number according to the code.

According to one embodiment, the first communication device and the second communication device are configured to perform a secure communication using the cryptographic key or two perform an authentication process using the cryptographic key.

The random number may for example be a random codeword of the code.

The masking of the device-specific number by means of the random number may for example include adding the random number to the device-specific number.

The code is for example a linear code.

According to one embodiment, the mapping of the masked device-specific number to a codeword of the code commutes with the masking by means of the random number.

According to one embodiment, the processing element is configured to wirelessly transmit the masked device-specific number to the second communication device and the mapping element is configured to wirelessly transmit the codeword to the first communication device.

Figure 7:
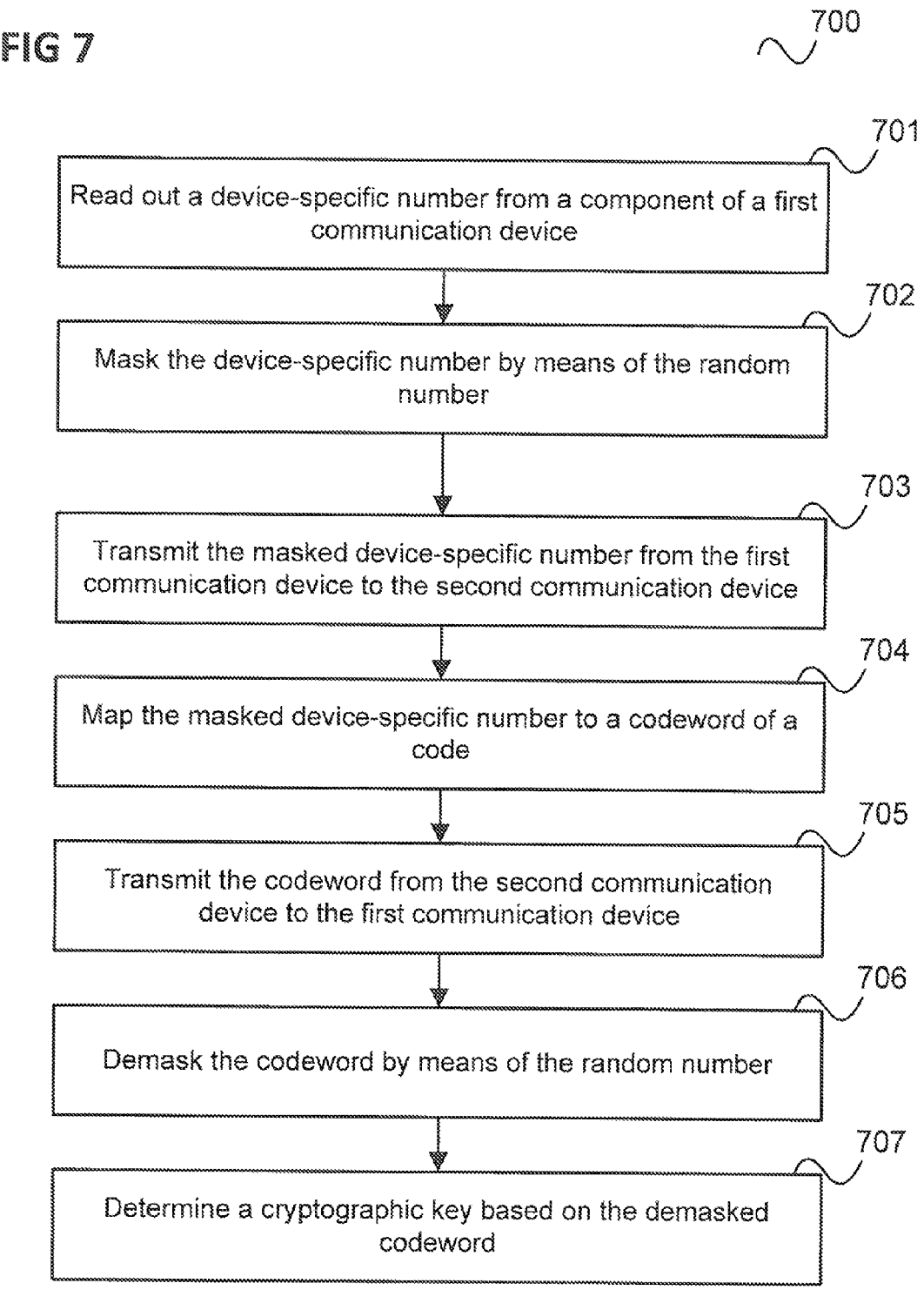
FIG. 7 shows a flow diagram illustrating a method for generating a cryptographic key.

FIG. 7 shows a flow diagram 700 illustrating a method for generating a cryptographic key.

In 701, a device-specific number is read out from a component of a first communication device.

In 702, the device-specific number is masked by means of the random number.

In 703, the masked device-specific number is transmitted from the first communication device to the second communication device.

In 704, the masked device-specific number is mapped to a codeword of a code.

In 705, the codeword is transmitted from the second communication device to the first communication device.

In 706, the codeword is demasked by means of the random number.

In 707, a cryptographic key is determined based on the demasked codeword.

Further, a communication device corresponding to the first communication device 601 may be provided, e.g., including a processing element configured to read out a device-specific number from a component of the communication device and to mask the device-specific number by means of the random number, a transmitter configured to transmit the masked device-specific number to the another communication device, a receiver configured to receive a codeword from the second communication device and a key generator configured to demask the codeword by means of the random number and to determine a cryptographic key based on the demasked codeword.

Similarly, a communication device corresponding to the second communication device may be provided including a receiver configured to receive a masked device-specific number from another communication device, a mapping element configured to map the masked device-specific number to a codeword of a code and a transmitter configured to transmit the codeword to the other communication device.

Further, a method for generating a cryptographic key and a method for providing a communication device with a codeword according to these communication devices may be provided.

The components of the communication devices (e.g. the processing element, the mapping element and the key generator) may for example be implemented by one or more circuits. A "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

In the following, embodiments are described in more detail.

Figure 8:
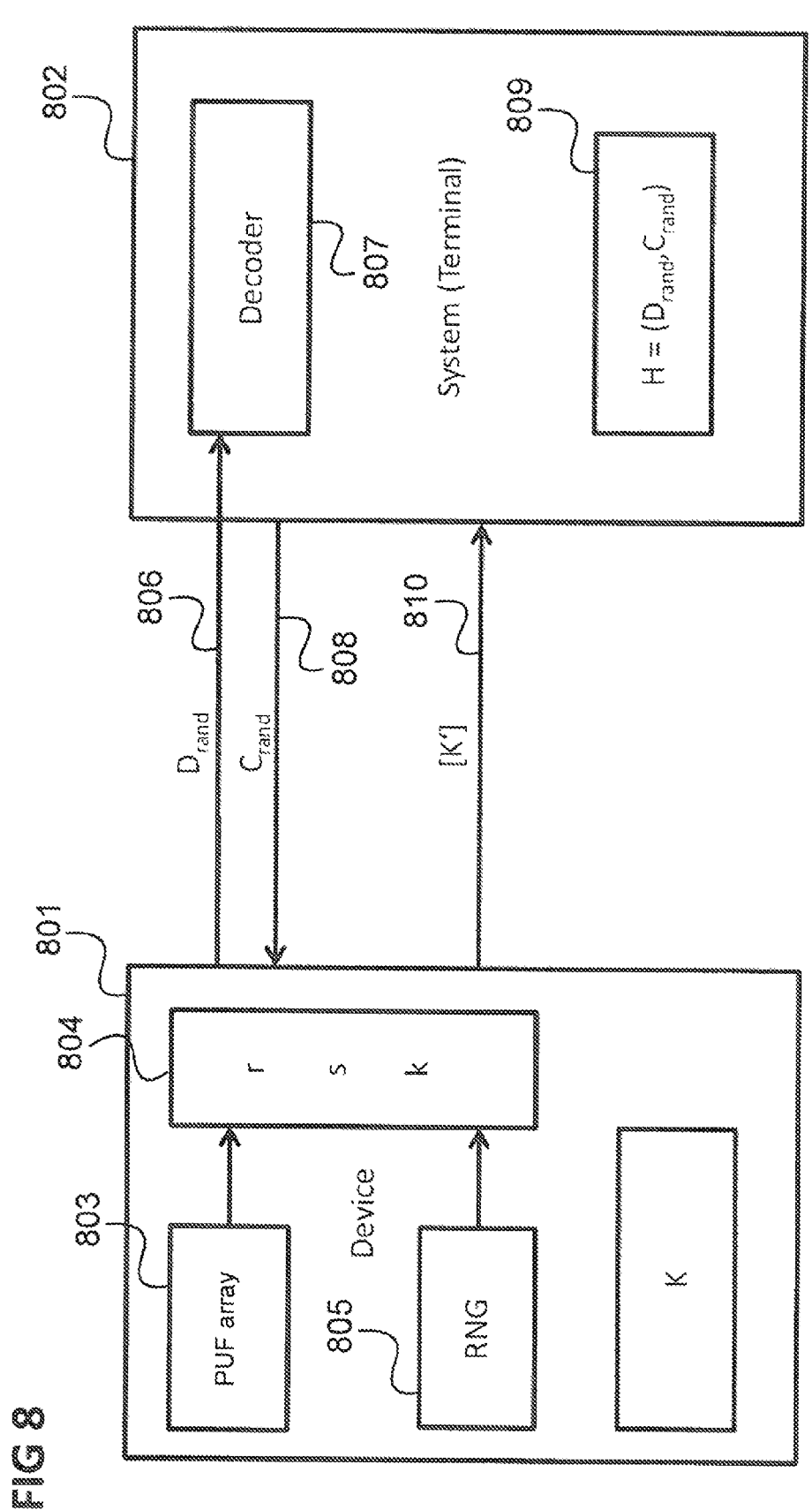
FIG. 8 shows the data flow for a setup for a PUF-based generation of a key.

FIG. 8 shows the data flow for a setup for a PUF-based generation of a key.

The data flow takes place between a device 801 and a system 802 as described with reference to FIG. 1.

The device 801 includes a PUF array 803 from which a PUF value $B \in M_B$ is read out. A value $D \in M_D$ is derived from the PUF value B by a processing element 804. For example, $M_B=M_D$ and D=B but other approaches may be used.

A random number generator 805 provides a random number $R \in M_R$ to the processing element 804 which generates a word (value) $D_{rand}$ according to a mapping $r:M_R \times M_D \to M_D$, $(R,D) \to D_{rand}$.

The mapping r has properties as discussed below. In 806, the device 801 transmits the value $D_{rand}$ to the system 802. The system 802 receives $D_{rand} \in M_D$ and determines a corresponding code word $C_{rand}$ of a code $M_C$ according to $j:M_D \to M_C$, $D_{rand} \to C_{rand}$.

It should be noted that the word $D_{rand}$ does not necessarily have to be a codeword in $M_C$. For example, the code word $C_{rand} \in M_C \subset M_D$ is the nearest codeword to $D_{rand}$. In this case, the mapping j is the decoding mapping $d:M_D \to M_C$ carried out by a decoder 807. However, other mappings may be used for j. The mapping j may even be a random mapping.

In 808, the system 802 sends the codeword $C_{rand}$ to the device 801 and stores (e.g. in a memory 809 of the system 802) the pair $(D_{rand}, C_{rand})$ as auxiliary data. Depending on the type of code compressed information may be stored as auxiliary data. For example, if the code is a linear code, $H=D_{rand} \oplus C_{rand}$ may be stored as auxiliary data.

The device 801 than applies the mapping s, which is the inverse mapping of r to $C_{rand}$ to generate a codeword C according to $s:M_R \times M_C \to M_C$, $(R,C_{rand}) \to C$.

The mappings r and s are inverse mappings in the following sense: the function s is defined on $M_D$, i.e.

$s:M_R \times M_D \to M_D$ and for each $R \in M_R$ it holds that $s(R,-) \circ r(R,-): M_D \to M_D \to M_D$ is the identity mapping on $M_D$. Both s and r map $M_C$ bjiectively on $M_C$. Further, it holds for r (as well as s) that $r_R := r(R,-)$ respects distances, i.e. if two values D and D' only differ by a low number of bits, then $r_R(D)$ and $r_R(D')$ only differ by a (e.g. the same) low number of bits. The meaning of "low number of bits" may be different for different applications. For example, in an application such as described further below, $r_R$ preserves the Hamming distance, i.e. the Hamming distance of D and D' is the same as the one of $r_R(D)$ and $r_R(D')$.

The processing element 804 then generates the secret K from C by means of a mapping $k:M_C \to M_K$, $C \to K$.

The mapping k can for example be a simple linear mapping, a projection or the identity function. It may also involve cryptographic functions like a hash function and others. The device 801 may transmit the key K in 810 to the system 802 or may generate a public key K' (corresponding to the private key K) and make it public for the system 802. The device 801 may also do this with the auxiliary data H in case that the system 802 has not determined them itself.

Figure 9:
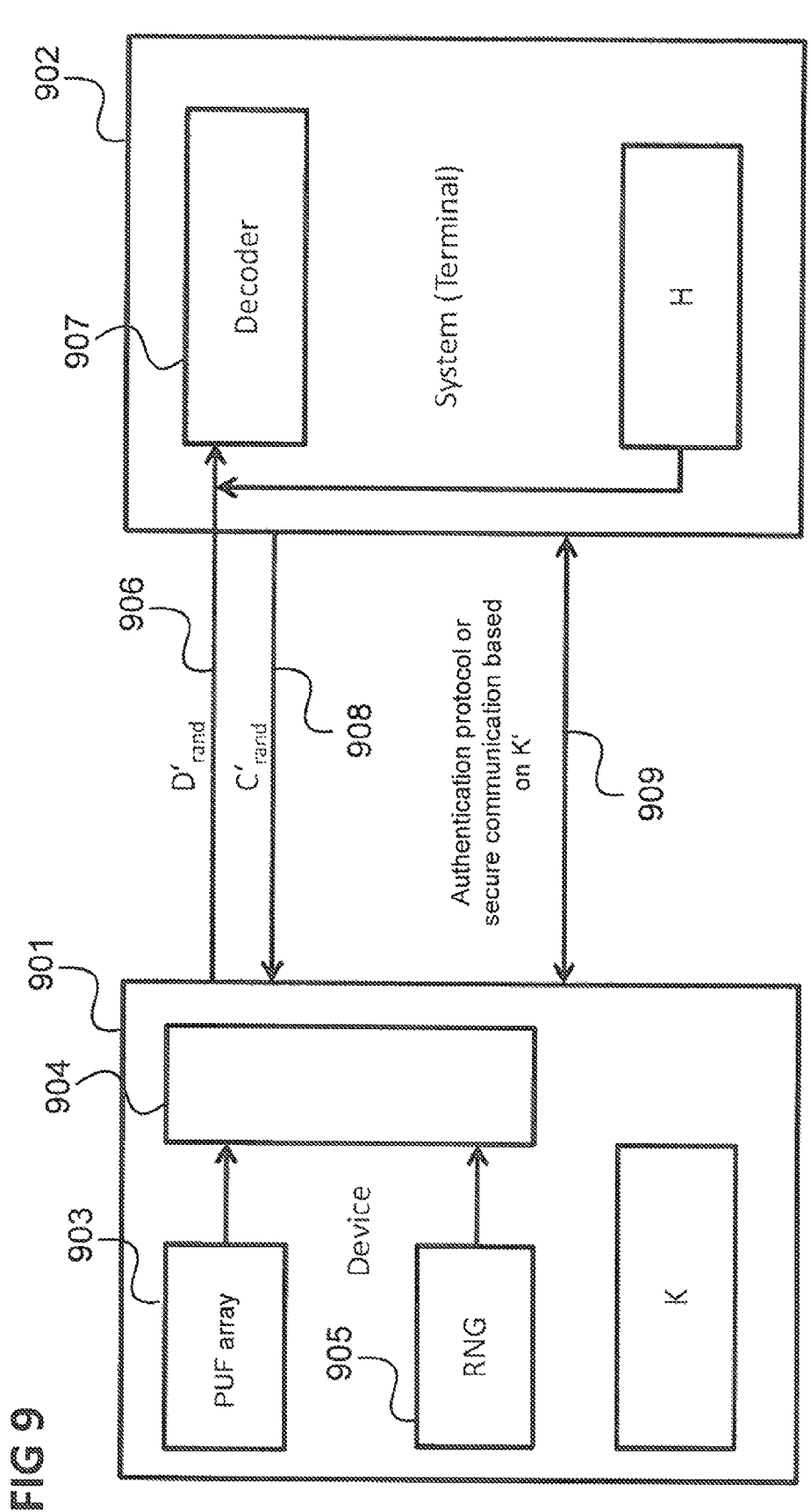
FIG. 9 shows the data flow for a reconstruction of a PUF-based generated key.

FIG. 9 shows the data flow for a reconstruction of a PUF-based generated key.

The data flow takes place between a device 901 and a system 902 corresponding to the device 801 and the system 802 of FIG. 8.

The reconstruction starts with the device 901 reading out the PUF array 903 to generate a PUF value $B' \in M_B$ which can be expected to differ from the PUF value B in a low number of digits. The processing element 904 derives a value $D' \in M_D$ from the PUF value B'. For example, in case of $M_D=M_B$, D'=B'. The random number generator 905 generates a random value $R' \in M_R$ and the processing element 904 determines $D'_{rand}$ according to $r:M_R \times M_D \to M_D$, $(R',D') \to D'_{rand}$ and transmits it to the system 902 in 906.

The system 902 receives $D'_{rand} \in M_D$ but does not directly supply it to the decoder 907 but centers it by means of the auxiliary data according to $z:M_H \times M_D \to M_D$, $(H,D'_{rand}) \to D''_{rand}$.

After that, it supplies $D''_{rand}$ to the decoder 907 which determines the nearest codeword $C'_{rand}$ according to $d:M_D \to M_C$.

The center mapping z is chosen such that it would correct errors of $D_{rand}$ with respect to $C_{rand}$ would be directly corrected. Specifically, the mapping z has the following three characteristics:

(i) $z_H := z(H,-)$ maps $D_{rand}$ to $C_{rand}$ where $H=(D_{rand}, C_{rand})$, i.e. $z_H(D_{rand})=C_{rand}$ (ii) $z_H$ commutes with r, i.e. for each R and $r_R := r(R,-)$ $z_H \circ r_R = r_R \circ z_H : M_D \to M_D$.

In other words:

$z_H(r_R(D))=r_R(z_H(D))$ and $s_R(z_H(r_R(D)))=z_H(D)$, for each $R \in M_R$ and $D \in M_D$.

(iii) $z_H$ respects distances i.e. if two values D and D' only differ by a low number of bits, then z(D) and z(D') only differ by a (e.g. the same) low number of bits. The meaning of "low number of bits" may be different for different applications. For example, in an application such as described further below, z preserves the Hamming distance, i.e. the Hamming distance of D and D' is the same as the one of z(D) and z(D').

In 908, the system 902 transmits $C'_{rand}$ to the device 901 and the processing element 904 determines $s(R',C'_{rand})=C$ and k(C)=K. In 909 it may then perform an authentication based or secure communication based on K and/or K'.

For showing that the reconstruction as described with reference to FIG. 9 works it is at first assumed that B'=B. Thus, D'=D and $D'_{rand}=r(R',D)$ $D_{rand}=r(R,D)$.

Because of characteristic (i) of z $C=s(R, C_{rand})=s(R, z_H(D_{rand}))=s(R,z_H(r(R,D)))=s(R, r(R, z_H(D)))=z_H(D)$ because s and r are inverse.

Thus, $(z_H(r(R',D))))=d(r(R',z_H(D)))$ (because of characteristic (ii) of z)

$=d(r(R',C))$ (because s and r are inverse)

$=r(R',C)$ (because d applied to a codeword is the identity and r maps identically $M_C$ to $M_C$.)

Therefore, $s(R',d(z_H(r(R',D)))))=C$.

Let now B' differ from B by a low number of bits. Then, r(R',D') also differs from r(R',D) by a low number of bits. Because of characteristic (iii) of z, $z_H(r(R',D'))$ then differs from $z_H(r(R',D))$ also by a low number of bits. Therefore, the mapping d maps $z_H(r(R',D'))$ and $z_H(r(R',D))$ to the same codeword such that again, the result is C.

In the following, a specific example is given based on a linear code. It is assumed that $M_C \subset M_D$ is a linear [n, m, f]-Code, $M_D=F_2^n$ and $M_C$ is an m-dimensional subspace of $M_D$. The code can detect and correct up to [F/2] bit errors in a word.

The PUF array 803 generates a value B of the set $M_B=F_2^n$. In this example, $M_B=M_D$ is chosen.

The set of random numbers is defined as $M_R := F_2^m$ and the coding mapping $c:M_R=F_2^m \to M_C \subset F_2^n = M_D$ is used to map a random number R provided by the random number generator 805 to a codeword c(R), e.g. by multiplying the binary vector corresponding to R by the generator matrix of the code.

The mapping r is in this example defined as
$r: M_R \times M_D \rightarrow M_D$
$r(R,D) := c(R) \oplus D$.

As XOR combination with the codeword $c(R)$ the mapping $r_R$ fulfills the requirement of bijectively mapping $M_C$ to $M_C$. Further, $r_R$ preserves the hamming distance. The inverse mapping s is simply given by $s = r$.

For j, the decoding mapping d: $M_D \rightarrow M_C$ is for example chosen. Alternatively, another mapping can be used such as a random function which maps each element D to a random codeword.

For z, the mapping
$z: M_H \times M_D \rightarrow M_D$, $((D_{rand}, C_{rand}), D) \rightarrow D_{rand} \oplus C_{rand} \oplus D$
is used in this example. The set $M_H$ is for example defined as $M_H = M_D \times M_D$ and the auxiliary data is $(D_{rand}, C_{rand})$. Alternatively, the set $M_H$ is defined as $M_H = M_D$ and the auxiliary data is $D_{rand} \oplus C_{rand}$ which is sufficient for the reconstruction.

It can be seen that z defined in this way fulfills the requirements (i), (ii) and (iii) given above.

Since the PUF value B (or B') is not transmitted itself but is masked by the codeword $c(R)$, an attacker is prevented from finding out the PUF value by listening to the communication channel between the device 801, 901 and the system 802, 902. Since in the above example, the number of code words is $2^m$, the security level lies at m bits maximum. An attacker or the system 802, 902 cannot derive more information from the process and thus has no knowledge of m bits since it cannot be distinguished whether a bit in the value transmitted from the device 801, 901 arises from B or from $B \oplus c(R)$ (assuming a solid random generation of R). Thus, an entropy of m is generated.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication arrangement, comprising:
   a first communication device; and
   a second communication device;
   wherein the first communication device comprises a processing element configured to read out a device-specific number from a component of the first communication device, to mask the device-specific number by a random number and to transmit the masked device-specific number to the second communication device;
   wherein the second communication device comprises a mapping element configured to map the masked device-specific number to a codeword of a code and to transmit the codeword to the first communication device; and
   wherein the first communication device further comprises a key generator configured to demask the codeword by the random number and
   to determine a cryptographic key based on the demasked codeword.

2. The communication arrangement of claim 1,
   wherein the device-specific number is a number specific for the first communication device.

3. The communication arrangement of claim 1,
   wherein the device-specific number is a Physically Unclonable Function value.

4. The communication arrangement of claim 1,
   wherein the component implements a Physically Unclonable Function.

5. The communication arrangement of claim 1,
   wherein the mapping of the masked device-specific number to a codeword of a code by the mapping element comprises combining the masked device-specific number with auxiliary data.

6. The communication arrangement of claim 1,
   wherein the mapping of the masked device-specific number to a codeword of a code by the mapping element comprises centering the masked device-specific number by auxiliary data.

7. The communication arrangement of claim 5,
   wherein the auxiliary data is data generated or stored in an initial mapping of the masked device-specific number to a codeword of the code.

8. The communication arrangement of claim 1,
   wherein the mapping element is configured to generate and store, in an initial mapping of the masked device-specific number to a codeword of the code, auxiliary data representing a difference between the masked device-specific number and the codeword.

9. The communication arrangement of claim 1,
   wherein the initial mapping of the masked device-specific number to a codeword of the code is a mapping of an initial version of the masked device-specific number arising from an initial read-out of the device-specific number from the component to a codeword of the code.

10. The communication arrangement of claim 1,
    wherein the component may provide different versions of the device-specific number in different read-outs.

11. The communication arrangement of claim 1,
    wherein the mapping of the masked device-specific number to a codeword of a code by the mapping element comprises decoding the masked device-specific number according to the code.

12. The communication arrangement of claim 1,
    wherein the first communication device and the second communication device are configured to perform a secure communication using the cryptographic key or to perform an authentication process using the cryptographic key.

13. The communication arrangement of claim 1,
    wherein the random number is a random codeword of the code.

14. The communication arrangement of claim 1,
    wherein masking the device-specific number by the random number comprises adding the random number to the device-specific number.

15. The communication arrangement of claim 1,
    wherein the code is a linear code.

16. The communication arrangement of claim 1,
    wherein the mapping of the masked device-specific number to a codeword of the code commutes with the masking by the random number.

17. The communication arrangement of claim 1,
    wherein the processing element is configured to wirelessly transmit the masked device-specific number to the second communication device and wherein the mapping element is configured to wirelessly transmit the codeword to the first communication device.

18. A method for generating a cryptographic key, the method comprising:
    reading out a device-specific number from a component of a first communication device;

masking the device-specific number by means of a random number;

transmitting the masked device-specific number from the first communication device to a second communication device;

mapping the masked device-specific number to a codeword of a code;

transmitting the codeword from the second communication device to the first communication device;

demasking the codeword by means of the random number; and determining a cryptographic key based on the demasked codeword.

19. A communication device, comprising:

a processing element configured to read out a device-specific number from a component of the communication device and to mask the device-specific number by a random number;

a transmitter configured to transmit the masked device-specific number to a second communication device;

a receiver configured to receive a codeword from the second communication device and a key generator configured to demask the codeword by means of the random number and to determine a cryptographic key based on the demasked codeword.

* * * * *